(Model.)

W. S. HUNTER.
Stock Car.

No. 241,542. Patented May 17, 1881.

WITNESSES
Hugh Walker
John D. Evans

INVENTOR
William Stuart Hunter

UNITED STATES PATENT OFFICE.

WILLIAM S. HUNTER, OF BELLEVILLE, ONTARIO, CANADA, ASSIGNOR OF ONE-HALF TO THOMAS FULLER, OF SAME PLACE.

STOCK-CAR.

SPECIFICATION forming part of Letters Patent No. 241,542, dated May 17, 1881.

Application filed December 10, 1880. (Model.)

*To all whom it may concern:*

Be it known that I, WILLIAM STUART HUNTER, of Belleville, in the county of Hastings and Province of Ontario, have invented certain Improvements in Stock-Cars, of which the following is a specification.

My invention relates to the combination of bars, rods, and folding partitions in such a manner that an ordinary cattle or stock car may be divided off into any number of stalls or compartments transversely, one or more animals being allotted to each stall, the object being to provide a stall the width of which can be regulated to the size of the animal when standing; but the animal can also lie down when so disposed, and in so doing encroach upon the space allotted to one or other, or both, of the animals on each side of it, but when it rises to its feet again it must confine itself to the space allotted to it.

Figure 1:
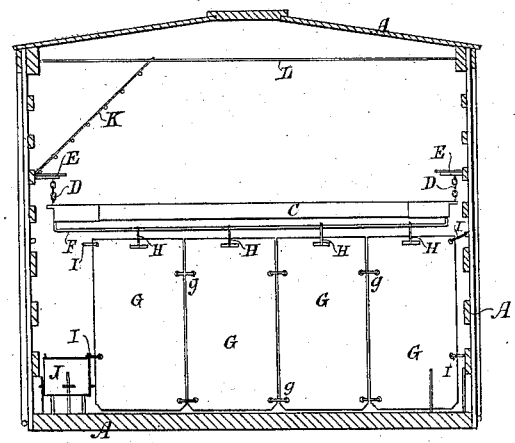
Figure 2:
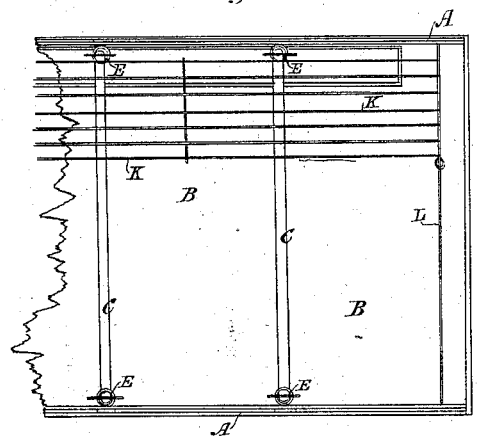

Figure 1 is a transverse section of a car embodying my invention. Fig. 2 is a partial plan of the same.

A represents the body of any stock-car now in general use.

B are stalls, formed by bars C running transversely of the car and suspended at each end by short chains D, passing through staples E. These staples are fastened along the sides of the car at suitable and convenient distances apart, in order that the stalls may be made of variable and of any width, as may be required. The short chains also are the means of giving a certain amount of oscillation to the stalls, and prevent largely the jolting which the animals would otherwise receive from a rigid fixture. They also offer a simple and ready means of fixing the partitions.

F is a rod of iron secured to the under side of the bar C, and attached to it at each end.

On this rod F is hung or suspended a partition, made of wood or iron, and composed of a number of slats, G, hinged vertically, as at *g*, and having a swivel and ring, H, fixed at the top and in the center of each. These slats slide along the rod F, and will fold up at either side of the car. The upper and lower corners of this partition are provided with chains I, which are again fastened to the sides of the car or trough J to keep the folding partitions in their proper positions. A partition made thus will conform to the shape of an animal when it lies down, and permit it to encroach upon the space allotted to the one next to it; but when the animal rises to its feet again, owing to the stiffness of the rod at the top, it is obliged to return to its circumscribed place.

J is a trough for feeding or watering the stock, and is placed along one side of the car, on or near the floor, and is kept in its place by being chained to the sides of the car, or by any other suitable contrivance. It also admits of being removed to the opposite side of the car when circumstances demand it, so that the car can be loaded from either side. Holes of sufficient size and suitable distances apart can be made in the sides of the car, immediately above the trough, for the purpose of filling the same with water or feed.

K is a hay-rack, hung from rods L, and secured on pins, or by other suitable means, on the sides of the car. Both sides are provided with these fastenings, in order that this rack may be transferred from one side of the car to the other by unfastening it at the lower edge and sliding it along the rods L to the other side, and securing it in the same manner. This hay-rack need not necessarily be used. It can be dispensed with, if so desired. Holes are also made in the sides of the car near the roof, at convenient distances apart, for the purpose of putting the hay into the rack.

When a car is to be loaded the trough is placed in position at the side opposite to that by which the animals enter. The hay-rack may or may not also be placed in position on the same side. The partitions also may be fastened at one end—viz., that at the trough—and the other raised to the roof or swung around out of the way; or they may be laid down on the floor near their proper places, or in any other manner which may prove most convenient. As the animals enter the car they are secured in their places by the partition, from each end of the car alternately toward the center, till the car is filled. When unloading, the last animal that went in will be the first one to go out, each partition being folded up and bar let down previous to the animal which they secured being let out.

I make no claim to the bar C, trough J, and rack K, for I am aware that these are not new, but

I claim as my invention—

The combination of the chains D, rod F, folding partitions G, and chains I, substantially as and for the purpose hereinbefore set forth.

WILLIAM STUART HUNTER.

Witnesses:
 HUGH WALKER,
 JOHN D. EVANS.